US005498346A

United States Patent [19]
Hadfield et al.

[11] Patent Number: 5,498,346
[45] Date of Patent: Mar. 12, 1996

[54] HYDROCYCLONES FOR OIL SPILL CLEANUP HAVING A CONTROLLED SPLIT RATIO

[75] Inventors: David A. Hadfield; Mark F. Schubert, both of Houston, Tex.

[73] Assignee: Conoco Specialty Products, Inc., Houston, Tex.

[21] Appl. No.: 300,986

[22] Filed: Sep. 6, 1994

Related U.S. Application Data

[62] Division of Ser. No. 971,901, Dec. 21, 1992, Pat. No. 5,366,641.

[51] Int. Cl.$^6$ .......................... B01D 17/038; B01D 17/12
[52] U.S. Cl. ..................... 210/739; 210/96.1; 210/143; 210/512.2; 210/747; 210/788
[58] Field of Search .................................. 210/96.1, 197, 210/242.3, 257.1, 258, 259, 512.1, 512.2, 513, 704, 729, 776, 787, 788, 804, 805, 806, 923, 170, 747, 143

[56] References Cited

U.S. PATENT DOCUMENTS

| | | | |
|---|---|---|---|
| 3,656,619 | 4/1972 | Ryan et al. | 210/242.3 |
| 3,743,095 | 7/1973 | Mensing et al. | 210/242.3 |
| 3,878,094 | 4/1975 | Conley et al. | 210/96.1 |
| 4,576,724 | 3/1986 | Colman et al. | 210/788 |
| 4,622,150 | 11/1986 | Carroll | 210/739 |
| 4,659,461 | 4/1987 | Carroll . | |
| 4,660,421 | 4/1987 | Dahlin et al. . | |
| 4,673,495 | 6/1987 | Carroll et al. . | |
| 4,698,152 | 10/1987 | Carroll | 210/96.1 |
| 4,711,132 | 12/1987 | Dahlin . | |
| 4,721,565 | 1/1988 | Carroll . | |
| 4,738,779 | 4/1988 | Carroll et al. | 210/512.2 |
| 4,749,490 | 6/1988 | Smyth et al. | 210/512.1 |
| 4,764,287 | 8/1988 | Colman et al. | 210/788 |
| 4,815,536 | 3/1989 | Prendergast et al. . | |
| 4,822,484 | 4/1989 | Prendergast et al. | 210/96.1 |
| 5,093,006 | 3/1992 | Kalnins | 210/704 |
| 5,286,375 | 2/1994 | Marrelli | 210/96.1 |
| 5,302,294 | 4/1994 | Schubert et al. | 210/788 |
| 5,366,641 | 11/1994 | Hadfield et al. | 210/512.2 |

FOREIGN PATENT DOCUMENTS 2191424 12/1987 United Kingdom .

OTHER PUBLICATIONS

Brochure entitled Jastram Forschung of Jastram–Werke GmbH of Hamburg, Germany (Undated but admitted to be prior art).
Robertson et al., "Hydrocyclone For The Treatment of Oil Spill Emulsions", Paper F3 presented at the Second International Conference on Hydrocyclones at Bath, England, Sep. 19–21, 1984.
International Patent Publication No. WO 89/04725 published May 19, 1989.
International Patent Publiction No. WO 89/07490 published Aug. 24, 1989.

(List continued on next page.)

Primary Examiner—Joseph W. Drodge

[57] ABSTRACT

An oil spill recovery system includes a first hydrocyclone separator and optionally a second hydrocyclone separator located on a floating vessel floating on a body of water from which spilled oil is to be recovered. A recovered fluid containing oil and water emulsion and a large amount of free sea water is recovered from the body of water. The first hydrocyclone separator separates the recovered fluid into a first underflow stream containing oily water and a first overflow stream which contains substantially all of said oil and water emulsion. The oily water underflow stream from the first hydrocyclone separator is then directed to a second hydrocyclone separator which separates it into a second underflow stream which is returned to the sea as clean water, and a second overflow stream. The first overflow stream is stored in on-board ship's storage. The second overflow stream may be stored in ship's storage or recycled for further separation.

2 Claims, 5 Drawing Sheets

OTHER PUBLICATIONS

Meldrum, "Hydrocyclones: A Solution To Produced Water Treatment", Paper OTC 5594 presented at 1987 Offshore Technology Conference, Houston, Texas.

Bell, et al., "Process in Motion: Experience With Oil/Water Separation On The Hutton TLP", Paper OTC 5358 presented at the 1988 Offshore Technology Conference in Houston, Texas.

International Patent No. WO 88/09696 dated Dec. 15, 1988.

Exhibit A—A brochure illustrating a Skim–pak™ remote floating skimmer available from the Douglas Engineering Division of U.S. Hydrex, Inc., of Walnut Creek, California (undated but admitted to be prior art).

Exhibit B—A brochure of Acme Products Co., of Tulsa Oklahoma (undated by admitted to be prior art).

Exhibit C—A brochure of Kepner Plastics Fabricators, Inc. of Torrance, California (undated but admitted to be prior art).

Exhibit D—Publication Illustrating a skimmer ship (undatd but admitted to be prior art).

Exhibit E—Brochure of Douglas Engineering Division of U.S. Hydrex, Inc. (undated but admitted to be prior art).

HYDROCYCLONES FOR OIL SPILL CLEANUP HAVING A CONTROLLED SPLIT RATIO

This is a division of application Ser. No. 07/971,901 filed Dec. 21, 1992, now U.S. Pat. No. 5,366,641.

BACKGROUND OF THE INVENTION

1. Field of the Invention

The present invention relates generally to processes and systems for separating oil and water, and more particularly, to oil spill recovery systems.

2. Description of the Prior Art

Commercial oil spill recovery skimmers can recover a fluid stream which typically comprises ten percent by volume oil and water emulsion and ninety percent by volume unwanted free sea water. The oil and water emulsion itself typically contains at least fifty percent, and perhaps as much as ninety percent, water. The condition of the recovered fluid varies greatly depending on the thickness of the oil layer, the state of the seas, the time the spill has weathered, etc. In a typical oil spill recovery vessel having no oil and water separation system located on site all of the recovered fluid is stored in the vessel. Thus the stored fluid may contain up to ninety-nine percent by volume water. If the oil and water could be efficiently separated on site so that the water or a large portion thereof could be returned to the sea and only the recovered oil stored, the oil spill recovery vessels' ability to remain on site and operate for long periods of time could be greatly extended.

The prior art does include systems which have been proposed for the on-site separation of oil and water from recovered oil spill fluids.

One system proposed by Jastram-Werke GmbH of Hamburg, Germany, known as the ORAS system uses an oil/water separator made up of a system of weirs and gates.

U.S. Pat. No. 3,743,095 to Mensing et al. proposes the use of a vortex separator to separate oil from an oil/water mixture which results from oil spills on a body of water.

Robertson et al., "HYDROCYCLONE FOR THE TREATMENT OF OIL-SPILL EMULSIONS", Paper F3 presented at the Second International Conference on Hydrocyclones at Bath, England, Sep. 19–21, 1984, discusses the use of hydrocyclones for the treatment of oil spill emulsions. It deals primarily with the breaking down of the emulsion to remove a portion of the water content thereof.

SUMMARY OF THE INVENTION

The present invention provides an oil spill recovery system utilizing a novel combination of a first hydrocyclone separator hydrocyclone followed by a second hydrocyclone separator, the combination of which provides a highly efficient separation of clean water which can be returned to the sea thus maximizing the oil concentration in the fluids which must be stored on the recovery vessel.

A skimmer or other conventional oil spill recovery means recovers from the sea a recovered fluid containing oil and water. This recovered fluid is conducted to a floating vessel floating on the body of water.

A hydrocyclone system located on the floating vessel includes a first hydrocyclone separator and a second hydrocyclone separator. In the first hydrocyclone separator, the recovered fluid is separated into a first underflow stream containing primarily free water, and a first overflow stream which primarily contains the oil and water emulsion recovered from the sea.

The first underflow stream, containing primarily free water with some free oil dispersed therein, then may run through the second hydrocyclone separator which separates that stream into a second underflow stream which is clean water which can be returned to the sea, and a second overflow stream which contains the remaining oil which was removed from the free water.

The first overflow stream containing the oil and water emulsion is directed to ship's storage where it is held until it is subsequently conveyed to an on-shore processing facility. The second overflow stream may also be directed to ship's storage or it may be recycled.

In one embodiment, the system described above takes the recovered fluid from the sea and sends it directly to the first hydrocyclone separator without any substantial gravity separation being permitted. In a second embodiment, the recovered fluid is first directed to ship's prestorage wherein some gravity separation is permitted, and then a water leg from the prestorage is pumped to the first hydrocyclone separator.

An alternative embodiment is provided wherein the hydrocyclones are supported on a remote floating skimmer.

Various monitoring and control systems are disclosed for use with the first hydrocyclone separator in order to optimize the efficiency thereof in response to varying flow rates and oil concentrations in the recovered fluid.

Numerous objects, features and advantages of the present invention will be readily apparent to those skilled in the art upon a reading of the following disclosure when taken in conjunction with the accompanying drawings.

DETAILED DESCRIPTION OF THE PREFERRED EMBODIMENTS

Figure 1:
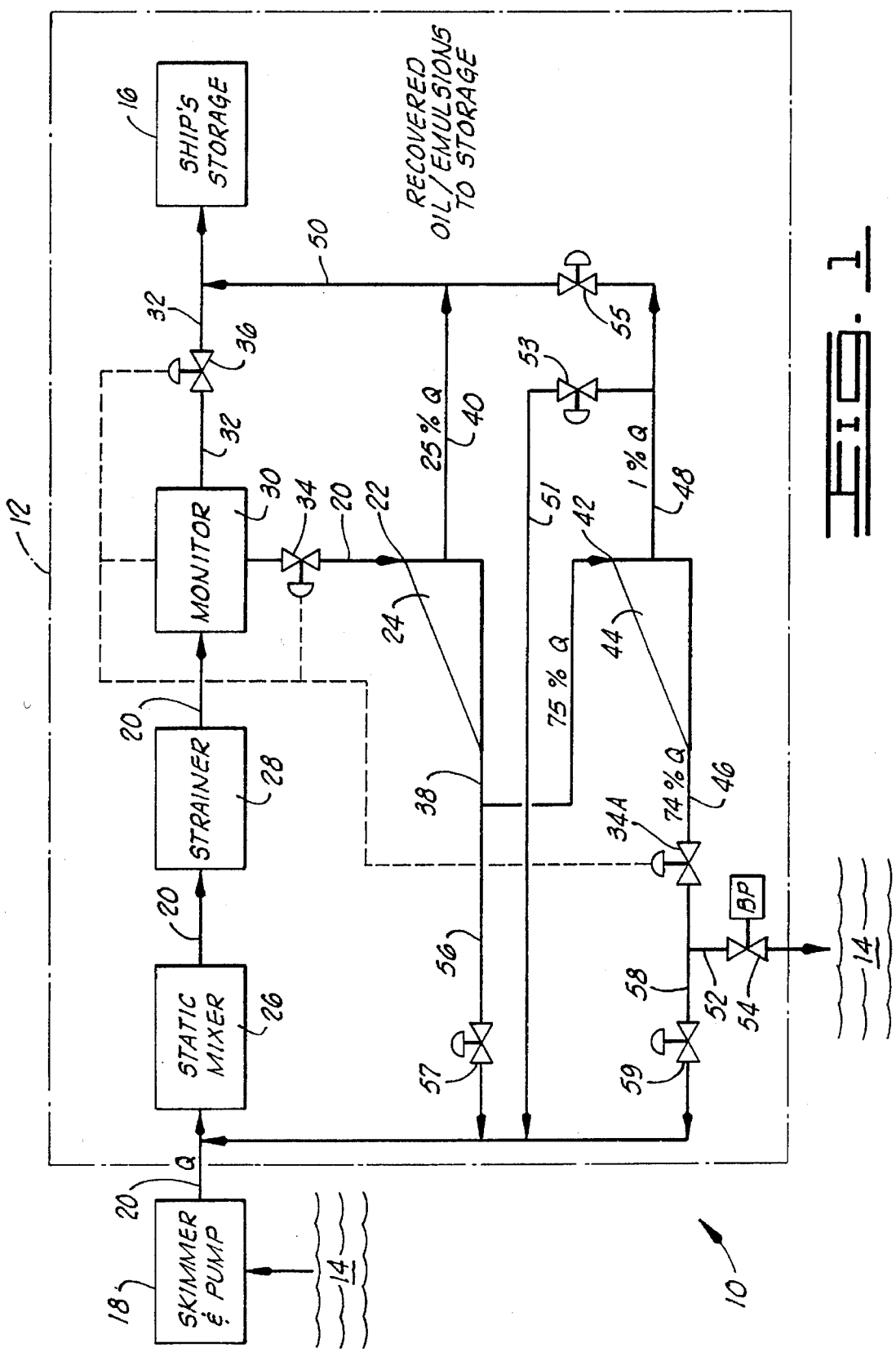
FIG. 1 is a schematic illustration of a first embodiment of the oil spill recovery system of the present invention wherein recovered fluids are sent directly through a static mixer to the first hydrocyclone separator without any opportunity for substantial gravity separation of the oil and water.

Referring now to FIG. 1, a first embodiment of the oil spill recovery system of the present invention is shown and generally designated by the numeral 10. The recovery system 10 includes a floating vessel schematically illustrated within the phantom line boundary 12 which is floating on a body of water 14, i.e., the sea 14.

The floating vessel 12 has a storage zone 16 defined therein which is commonly referred to in this disclosure as ship's storage 16.

The system 10 includes an oil recovery means 18 which may be a conventional skimmer and pump device for recovering from the sea a recovered fluid containing oil and water which is pumped through a recovered fluid supply conduit means 20 on board to the floating vessel 12. Spilled fluids could also be recovered onto a conventional skimmer ship which scoops up the fluid as it moves through the sea.

The nature of the recovered fluids may of course vary widely depending upon the nature of the fluid which was spilled, and the subsequent evolvement of that fluid over time due to environmental conditions. Typically the recovered fluids will contain a relatively low percentage, e.g., ten percent by volume, of an oil and water emulsion often referred to as a mousse. The remainder of the recovered fluid will be free sea water with some small amount of free oil dispersed therein. The oil and water emulsion or mousse is typically a very stable emulsion containing the heavier hydrocarbons which are left after the lighter hydrocarbons evaporate. Typically the emulsion has been highly agitated by wind, wave and rain action and the water contained in the emulsion is tightly bound therein. Also the emulsion will often be at relatively low temperatures and thus be relatively viscous.

With the system 10 of FIG. 1, the recovered fluids are normally conducted directly to an inlet 22 of a first hydrocyclone separator 24. The preferred geometry for first hydrocyclone separator 24 is further described below.

The recovered fluid first flows through a static mixer 26 disposed in supply conduit 20 which provides a means for mixing the oil and water of the recovered fluid, for thereby reducing oil slugs which may reach the first hydrocyclone separator 24. It will be understood that the fluid recovered by recovery device 18 will be very non-uniform in its makeup over a period of time. That is, the recovered fluid will from time to time have greatly varying concentrations of oil therein and may in fact include oil slugs of nearly pure oil from time to time. The first hydrocyclone separator 24 is designed to handle relatively low percentages of oil, and thus its operating efficiency can be improved if the oil slugs in the recovered fluid can be somewhat smoothed out through use of the static mixer 26.

From the static mixer 26, the recovered fluid goes through a conventional strainer 28 disposed in supply conduit 20 to remove foreign material often times found in oil spills, and then flows through a monitoring device 30 before it reaches the first hydrocyclone separator 24.

The recovered fluid supply conduit means 20 may be described as a means for conveying the recovered fluid directly from the recovery device 18 to the inlet 22 of first hydrocyclone separator 24 without allowing any significant gravity induced separation of oil and water in the recovered fluid prior to the recovered fluid entering the first hydrocyclone separator 24.

The monitoring device 30 is provided to monitor the makeup of the recovered fluid flowing through the recovered fluid supply conduit means 20 toward the first hydrocyclone separator 24. If it is determined that the recovered fluid contains an oil concentration in excess of that which can be handled by the first hydrocyclone separator 24, then the recovered fluid is diverted through a bypass conduit 32 to the ship's storage 16 without flowing through the hydrocyclone separator system. The control of flow of the recovered fluid to either the first hydrocyclone separator 24 or through the bypass conduit 32 to ship's storage 16 is controlled by first and second control valves 34 and 36 which are operably associated with the monitoring device 30 so as to be open and closed in response to signals received from a control system contained therein. If the oil concentration in the recovered fluids is at relatively low levels, the control valve 34 will remain open and the control valve 36 will remain closed, which can be considered their normal positions, so that the recovered fluids are directed to the first hydrocyclone separator 24. If, however, an excessively high concentration of oil is detected in the recovered fluid by the monitoring device 30, it will cause the control valve 36 to open, and then cause the valve 34 to close, thus allowing the recovered fluids to be directed through the bypass conduit 32 directly to ships storage 16. When the oil concentration again drops into its normal range for which the first hydrocyclone separator 24 is designed, the valve 34 will reopen and then the valve 36 will reclose thus again allowing the recovered fluids to flow to the first hydrocyclone separator 24. Valve 34 optionally could be located in position 34A in second underflow stream 46.

Optionally, the monitoring device could signal underflow control valve 34A to close, diverting all recovered fluid through the overflow streams 40 and 48 to ship's storage 16, eliminating the need for the bypass line 32.

The monitoring device 30 may be an EXAC Model 8300EX mass flow meter available from EXAC Corp. of San Jose, Calif., as is further described in U.S. Pat. Nos. 4,660,421 and 4,711,132, the details of which are incorporated herein by reference. Also other meters operating on principles of microwave, light diffraction/absorption, laser energy, density, acoustics, etc., could be used.

The percentage of oil content in the recovered fluids which can be handled by first hydrocyclone separator 24 without need for bypassing the same through bypass conduit 32 will vary depending upon the degree of difficulty of separating the oil from the recovered fluids. For example, some recovered fluids may be relatively fresh and the emulsion may not be nearly so tightly bound as in other cases. Typically, the monitoring device 30 would be set so that if greater than fifty percent oil were contained in the incoming recovered fluid stream the entire recovered fluid stream would be diverted to ships storage. That, however, must be adjusted based upon observations of the performance of the hydrocyclone separating system. If the discharged water through conduit 52 contains excessive amounts of oil, and if this cannot be corrected by modifying the split ratio within the first hydrocyclone separator 24 itself, then it will be necessary to lower the bypass limit on monitoring device 30 to cause it to bypass the recovered fluids at lower oil percentages.

The first hydrocyclone separator 24 separates the recovered fluid into a first underflow stream 38 and a first overflow stream 40. First underflow stream 38 may be more generally referred to as a first more dense stream 38, and first overflow stream 40 may be more generally referred to as a first less dense stream 40, since underflow stream 38 will be more dense than overflow stream 40. The primary purpose of the first hydrocyclone separator 24 is to separate most of the bulk free water from the oil and water emulsion; there may, however, be some relatively small reduction of the water content of the emulsion itself. The split ratio between the first underflow stream 38 and first overflow stream 40 will generally be controlled and monitored by one of the systems described in FIGS. 3–7.

The first underflow stream 38 is directed to the inlet 42 of a second hydrocyclone separator 44. The second hydrocyclone separator 44 separates the first underflow stream 38 into a second underflow stream 46 and a second overflow stream 48. Again, the second underflow stream 46 may be referred to more generally as a second more dense stream, and second overflow stream 48 may be referred to as a second less dense stream. The second hydrocyclone separator 44, which may be referred to as a de-oiling hydrocyclone, may be constructed in accordance with the teachings of U.S. Pat. No. 4,576,724 to Colman et al., and U.S. Pat. No. 4,764,287 to Colman et al., the details of which are incorporated herein by reference.

A storage conduit means 50 carries the first overflow stream 40 and the second overflow stream 48 to the ship's storage 16. Optionally, the second overflow 48 may be recycled through recycle conduit 51 as controlled by valves 53 and 55.

A water discharge conduit means 52 returns the de-oiling hydrocyclone underflow stream to the sea 14. A back pressure regulator 54 in conduit 52 controls a back pressure on second underflow 46.

A typical example of the flow rates through the various portions of the system 10 would be as follows. The incoming flow rate of recovered fluid through recovered fluid supply conduit means 20 is designated as Q. The typical split ratio in the first hydrocyclone separator 24 would direct seventy-five percent Q to the first underflow stream 38 and twenty-five percent Q to the first stream 40. All of the oil and water emulsion in the recovered fluid would be contained in the first overflow stream 40. The first underflow stream 38 would contain primarily free sea water with a relatively small amount of free oil dispersed therein and with some dissolved oil dissolved in the free water. The first underflow stream 38 from first hydrocyclone separator 24 is then de-oiled in the second hydrocyclone separator 44 which would split that stream into approximately seventy-four percent Q going to the second underflow stream and thus being returned as clean water to the sea, and with approximately one percent Q being directed to the second overflow stream which would return to ship's storage. The one percent Q flowing to the second overflow stream 48 would contain most of the free oil which had previously been left in the first underflow stream 38. The second hydrocyclone separator 44 thus removes most of the free oil from the first underflow stream 38, and the second underflow stream 46 will contain less than 1000 PPM oil, and preferably less than 500 PPM, thus meeting acceptable limits for water which may be returned to the sea after an oil spill recovery process. This remaining oil in second underflow stream 46 will be in the form of free oil dispersed in free water and dissolved oil dissolved in free water.

While in certain situations it is conceivable that further oil/water separation systems might be disposed downstream of the second underflow stream 46, it is envisioned that in a properly designed system according to the present invention the second underflow stream 46 can be returned directly to the sea without any need for further cleaning of the water.

It is noted that both the first hydrocyclone separator 24 and the second hydrocyclone separator 44 may each be comprised of a bank of parallel hydrocyclones. This will be determined based upon the flow rate of recovered fluids which must be treated and the design flow rate for the particular hydrocyclone units which are chosen.

Optionally, a portion of first underflow stream 38 and/or second underflow stream 46 may be recycled through recycle conduits 56 and 58 as controlled by valves 57 and 59, respectively.

Also in some situations where the first underflow stream 38 is clean enough to return to the sea, it will be possible to eliminate the second hydrocyclone separator 44.

Figure 8:
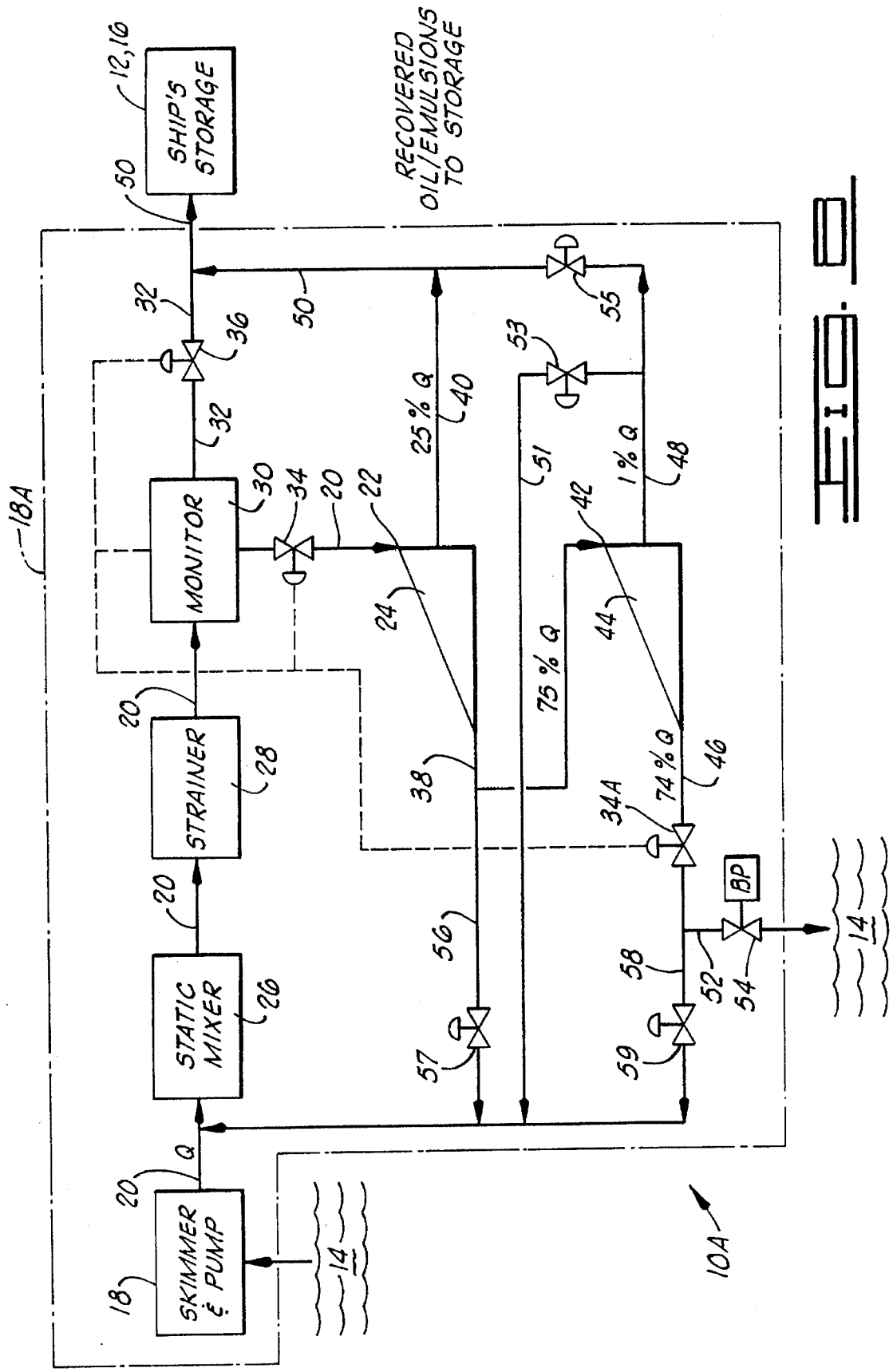
FIG. 8 is a schematic illustration of a system similar to that of FIG. 1, except that the hydrocyclones are supported on a remote floating skimmer.

The Embodiment of FIG. 8

FIG. 8 illustrates a modification of the system 10 of FIG. 1 which is designated as the system 10A.

In the system 10A, the hydrocyclones 24 and 44 and associated piping and valving are supported from a remote floating skimmer device 18A. The overflow streams 40 and 48 are connected by storage conduit 50 to the ship's storage 16 located on floating vessel 12.

Figure 2:
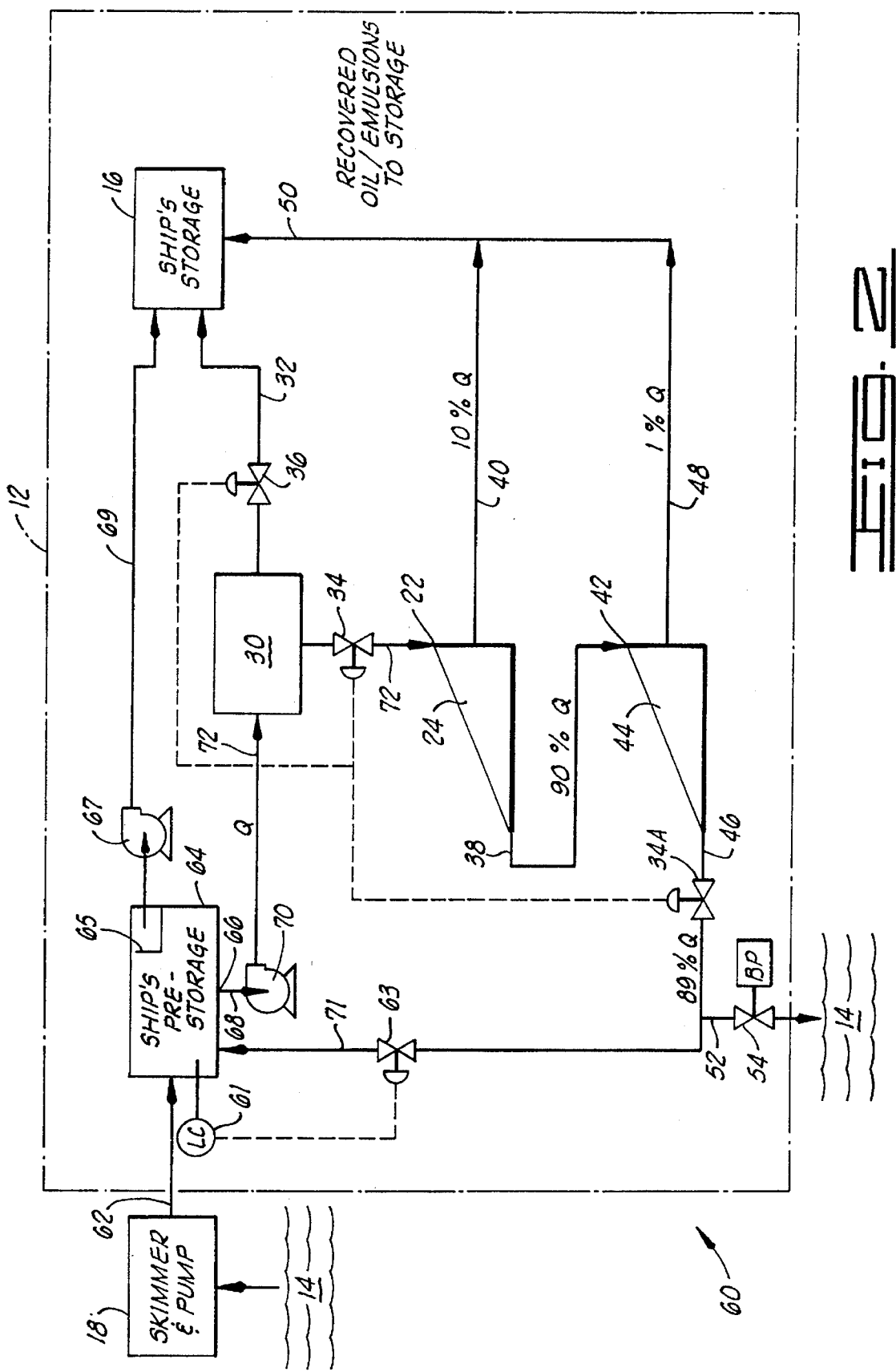
FIG. 2 is a schematic illustration of a second embodiment of the invention wherein the recovered fluids are first directed to ship's prestorage wherein the oil and water emulsion is allowed to separate somewhat from the free water, before the recovered fluids are directed to the first hydrocyclone separator.

The Embodiment of FIG. 2

Referring now to FIG. 2, an alternative embodiment of the oil spill recovery system of the present invention is shown and generally designated by the numeral 60. Those components of the system 60 which are identical to those of the system 10 of FIG. 1 are identified by the same identifying numerals. The system 60 is modified as compared to the system 10 in that the system 60 provides for a prestorage and gravity separation of the oil and water in the recovered fluids prior to introducing the recovered fluid to the first hydrocyclone separator 24.

In the system 60, the skimmer device 18 pumps the recovered fluids through a recovered fluid supply conduit 62 to a prestorage zone 64, also referred to herein as ship's prestorage 64, on or within the vessel 12. Again, the skimmer device 18 may be remote from the floating vessel 12, or the vessel 12 may be a skimmer ship which incorporates its own skimming device which scoops up fluid as the ship moves through the sea. Prestorage zone may be existing compartmentalized storage in the ship or a storage container on the deck of the ship. If the hydrocyclones are supported from a remote floating skimmer device as shown in FIG. 8, the prestorage zone 64 could also be located on the remote floating skimmer device. The recovered fluid is allowed to reside in the prestorage zone for a sufficient time to allow significant gravity induced separation of the oil and water in the recovered fluid and particularly to allow gravity induced separation of the free water from the oil and water emulsion which will tend to rise to the top of the prestorage zone 64.

The prestorage zone 64 has a water leg discharge outlet 66 communicated with a lower portion of the prestorage zone 64. A suction conduit 68 communicates the water leg discharge outlet 66 with a suction inlet of a booster pump 70. A pump discharge conduit 72 connects a discharge outlet of the booster pump 70 to the inlet 22 of the first hydrocyclone separator 24.

Typically, the prestorage zone 64 will be sized so as to provide a residence time therein on the order of thirty minutes for the recovered fluids flowing therethrough. In that time, much of the free water will separate from the recovered fluid and settle toward the lower end of the prestorage zone 64 from which it is withdrawn at the water leg discharge outlet 66. Coalescence inducing chemicals may be added in prestorage zone 64, and/or a mechanical coalescing device (not shown) may be placed upstream of first hydrocyclone separator 24.

Much of the oil and water emulsion will separate out in the ship's prestorage 64 and will pass over a weir 65 and will be drawn off by a booster pump 67 which will pump the skimmed oil and water emulsion through an oil line 69 to the ships storage 16. This may also be accomplished in some cases by gravity flow. Additionally, if excess oil builds up in the prestorage 64 and is pulled through the water leg discharge outlet 66 by the booster pump 70, this will be monitored by the monitoring device 30 which can divert or bypass the fluid through bypass conduit 32 directly to ship's storage 16 in a manner previously described with regard to FIG. 1.

With the modified system of FIG. 2, typical flow rates through the various components thereof could be as follows. For a flow rate Q of recovered fluid withdrawn from water leg discharge outlet 66, the first hydrocyclone separator 24 would direct ninety percent Q to its underflow stream 38 and ten percent Q to its overflow stream 40. The second hydrocyclone separator 44 would then direct one percent Q to its overflow stream 48, and eighty-nine percent Q to its underflow stream 46 which is returned to the sea.

It is desirable to provide a means for controlling the liquid level in the prestorage zone 64 to avoid running the pump 70 dry. This can be accomplished by a partial recycling of second underflow stream 46 through recycle conduit 71 as controlled by level controller 61 and control valve 63. Optionally, valve 34A can be operated in response to the fluid level in prestorage 64 thus changing a back pressure against pump 70. Also, a variable speed control of pump 70 could be controlled in response to the fluid level in prestorage 64.

Control Systems of FIGS. 3–7

Turning now to FIGS. 3–7, several different approaches to monitoring and controlling the split ratio between the underflow and overflow of the first hydrocyclone separator 24 are schematically illustrated. It will be understood that any one of these control systems or combinations or modifications thereof can be utilized with the first hydrocyclone separator 24 in either the system 10 of FIG. 1, the system 10A of FIG. 8, or the system 60 of FIG. 2.

Such a monitoring and control system is generally desirable because of the constantly changing water-to-oil ratios expected in the recovered fluid stream from the skimmer 18. If a situation were encountered where a relatively constant water-to-oil ratio is present, such as is likely in the system of FIG. 2, then there would be no need for such a monitoring and control system.

Generally speaking, a makeup of at least one of the incoming recovered fluid stream 20, the first underflow stream 38, the first overflow stream 40 and the second underflow stream 46 is monitored. The "makeup" of the stream refers to the relative proportions of the oil and water in the stream.

Figure 3:
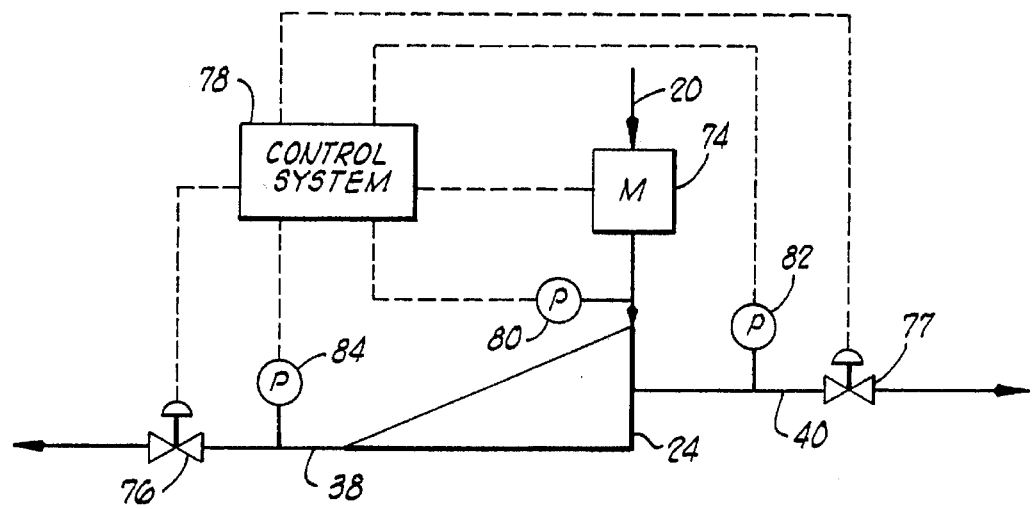
FIG. 3 is a schematic illustration of a first embodiment of a monitoring and control system for use with the first hydrocyclone separator.

FIG. 3 illustrates the monitoring of the makeup of the incoming recovered fluid stream 20. A monitoring means 74 is placed in the recovered fluid stream 20. The monitoring means 74 preferably is a mass flow meter of the same type described above for the mass flow meter 30 of FIG. 1. It will be understood that the mass flow meter 30 and the metering device 74 may in fact be one single monitoring device used both to control the split ratio of first hydrocyclone separator 24 and also to bypass the entire recovered fluid stream directly to ship's storage 16 if the oil concentration thereof is so high that it cannot be handled by the first hydrocyclone separator 24.

Based upon the incoming water-to-oil ratio monitored by the mass flow meter 74, the position of a control valve 76 is changed by a control system 78 so as to control the split ratio, that is the ratio of the fluid flow rate of the first underflow stream 38 to that of the first overflow stream 40. Alternatively or in addition to the control valve 76 in the underflow stream 38, there may be a control valve 77 in the first overflow stream 40 which may also be utilized to help control the split ratio between the first underflow stream 38 and first overflow stream 40 in response to command signals from the control system 78.

The control system 78 associated with the monitoring device 74 and control valve 76 will be constructed so as to control the split ratio as desired in response to the monitored incoming water-to-oil ratio. For example, in many situations it is desirable to have a split ratio between the underflow and overflow nearly equal to the water-to-oil ratio. That is, if the monitoring device 74 determines that the incoming stream is made up of ninety percent water and ten percent oil, the control system 78 may adjust the control valve 76 so that approximately the same ninety percent-ten percent ratio is present between the underflow stream 38 and the overflow stream 40. Although the theoretical preference in some cases may be for the split ratio to be equal to the incoming fluid ratio, in reality an exact separation cannot be achieved and thus the general practical preference is to operate the underflow rate at slightly less than the incoming water percentage thus pushing an excess of water to the overflow to insure a cleaner underflow at the expense of wetter oil. Typically the underflow ratio will be somewhere in the ratio of fifty to ninety percent of the inlet water percentage depending on the difficulty of separation. For situations where separation is relatively easy, the underflow rate would typically be approximately ninety percent of the incoming water percentage. For situations where separation is difficult, the underflow rate may be as low as fifty percent of the incoming water percentage. Thus, the split ratio can be said to be proportional to the incoming water percentage.

The control system 78 may also have associated therewith various means for monitoring the flow rate through the underflow stream 38 and the overflow stream 40 to confirm that the desired split ratio has been achieved. For example, first, second and third pressure monitoring means 80, 82 and 84 may be connected to the inlet line 20, overflow line 40, and underflow line 38, respectively. Signals corresponding to the sensed pressure at those locations are communicated back to the control system 78 through the various electrical connecting means illustrated therebetween. It will be understood by those skilled in the art that the pressure drop between 80 and 84 provides a measure of the flow rate through the underflow stream 38 whereas the pressure drop between 80 and 82 provides a measure of the flow rate through the overflow stream 40 for a particular hydrocyclone separator 24.

The control system 78 may be microprocessor based, but it does not have to be.

Figure 4:
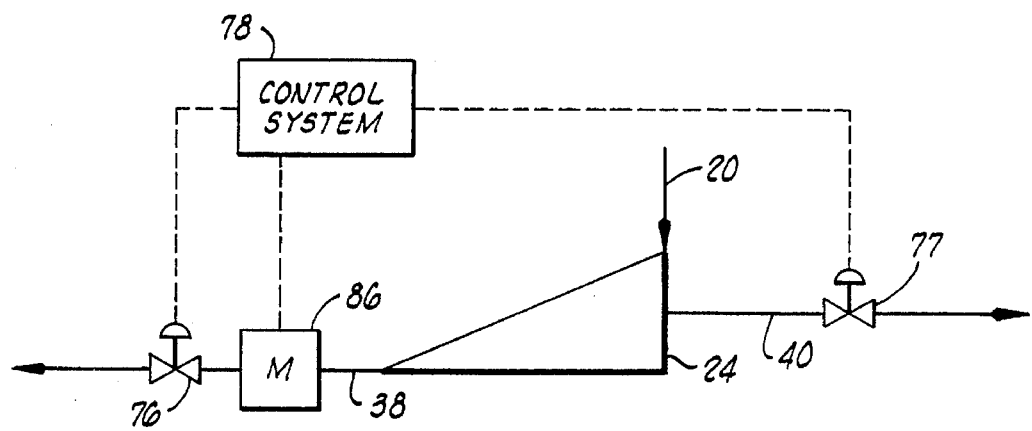
FIG. 4 is a schematic illustration of a second embodiment of a monitoring and control system for the first hydrocyclone separator.

FIG. 4 illustrates an alternative control system wherein it is the makeup of the underflow stream 38 that is monitored with a monitoring device 86. Due to the much lower oil concentrations present in the underflow stream 38 as compared to the inlet stream 20, the monitoring device 84 may be a turbidity meter. One suitable such monitoring device is the Optek Model No. 510E/TF10-ASA-EX available from KC Controls, Ltd., of Reigate, Surrey, United Kingdom. The Optek turbidity meter is a simple optical light absorption monitor which is used to measure the quality of the underflow water stream and thus to use this variable to control the split ratio. Monitoring of the underflow stream 38 is simpler than monitoring of either the inlet stream 20 or overflow stream 40 as it deals with relatively low levels of oil in water. Other types of monitoring devices such as those described above for device 30 could also be used.

The turbidity meter 86 provides an indication of the concentration of oil in the oily water stream 38 as increasing oil content increases the cloudiness or turbidity of the fluid. Again, the monitoring device 86 is connected to the control system 78 which operates control valves 76 or 77. Although not illustrated in FIG. 4, the control system 78 can have associated therewith various flow rate indicating measuring devices such as the pressure monitoring devices 80, 82 and 84.

With the system of FIG. 4 wherein the turbidity meter 86 monitors the oil content of the underflow stream 38, the control system 78 controlling control valve 76 will have both an upper limit and a lower limit set therein for the oil content of the underflow stream 38. When the oil content of the underflow stream 38 exceeds the upper limit of control system 78, the control system 78 will act to reduce the opening through the control valve 76 thus decreasing a percentage of the inlet stream 20 which goes to the underflow stream 38 thereby protecting the quality of the underflow stream 38 and ultimately of the discharged water stream 52. On the other hand, if the monitored oil content of the underflow stream 38 drops below a lower limit set within the control system 78, the control system 78 will cause the opening through control valve 76 to be increased thus increasing the percentage of the inlet stream 20 which goes to the underflow stream 38 thus reducing the amount of water going into the overflow stream 40 and thus reducing the amount of water which is unnecessarily stored in ship's storage 16.

Typically the first underflow stream 38 from the first hydrocyclone separator 24 should contain approximately 2,000 PPM oil. Streams of this quality can then be adequately further de-oiled in second hydrocyclone separator 44 to provide satisfactory discharge water qualities in discharge stream 52. These desired results could correspond for example to high and low limits set in the control system 78 of 10,000 PPM and 300 PPM oil, respectively, for the first underflow stream 38.

Figure 5:
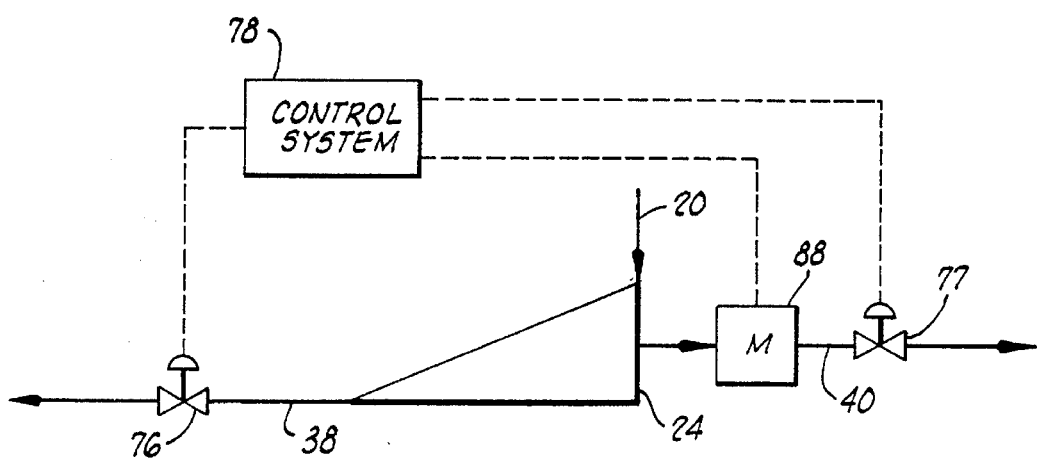
FIG. 5 is a schematic illustration of a third embodiment of a monitoring and control system for the first hydrocyclone separator.

FIG. 5 illustrates yet another alternative control arrangement in which a monitoring device 88 is placed in the first overflow stream 40. The monitoring device 88 is preferably a mass flow meter of the same style as the mass flow meter 30 described with regard to FIG. 1. Again, monitoring device 88 is connected to the control system 78 which controls control valves 76 and/or 77. Again, the control system 78 may have associated therewith various pressure monitoring devices 80, 82 and 84.

Figure 6:
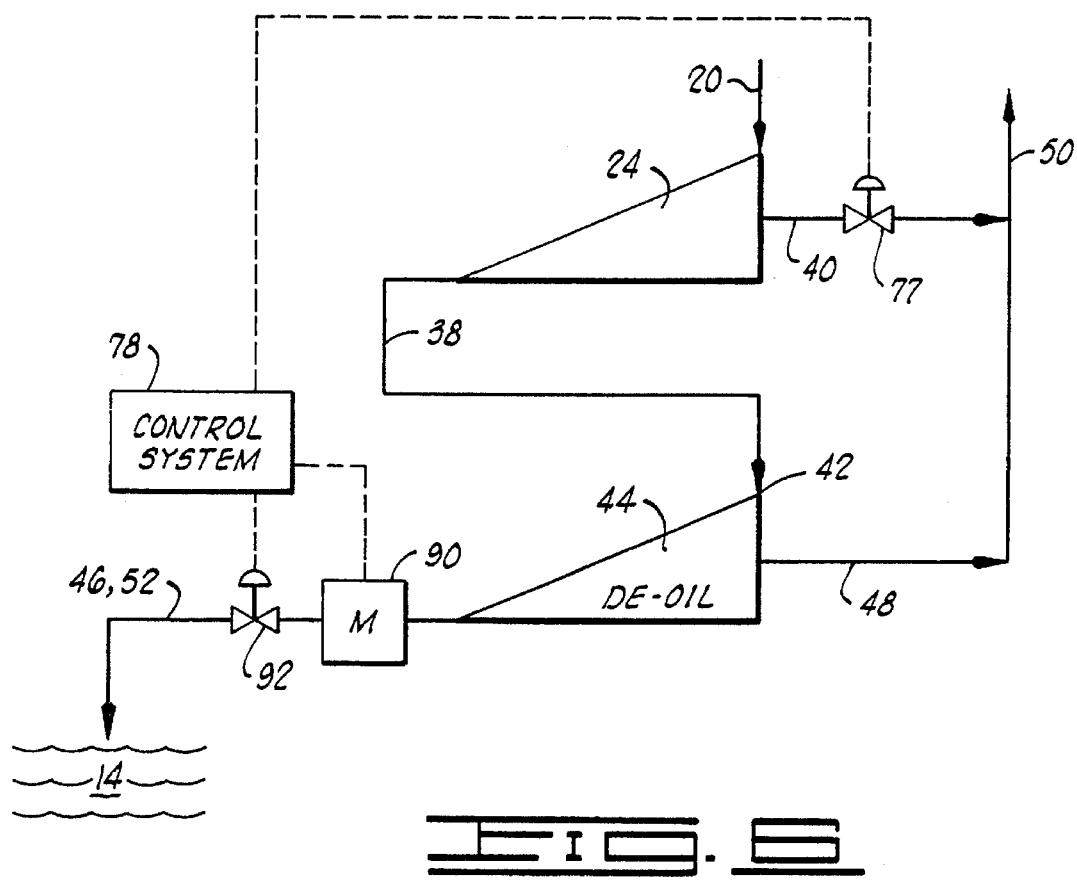
FIG. 6 is a schematic illustration of a fourth embodiment of a monitoring and control system, illustrating the possibility of monitoring the underflow from the second hydrocyclone separator.

FIG. 6 schematically illustrates another alternative control system in which the quality, that is the degree of oil contamination, in the discharge clean water stream 46, 52 is directly monitored by monitoring device 90. The monitoring device 90 may be a turbidity meter of the same type as described above in connection with monitoring device 86 of FIG. 4. The monitoring device 90 is connected to control system 78 which can control the control valve 77 in the first overflow stream 40 and/or a control valve 92 placed in the second underflow stream 46.

Figure 7:
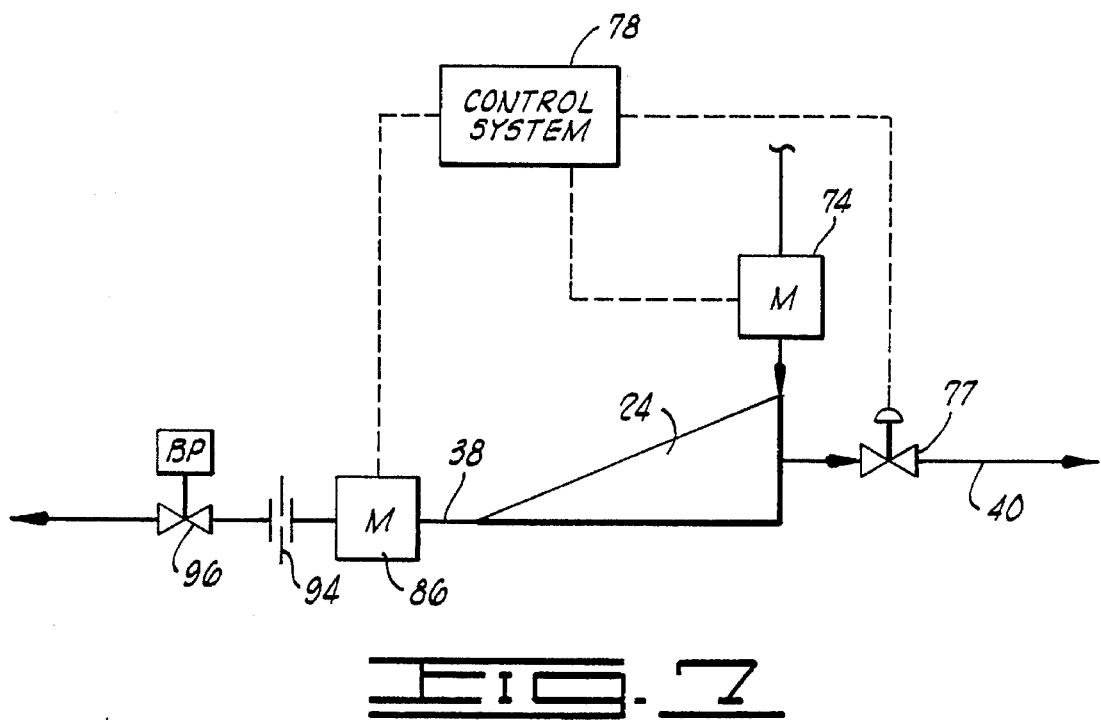
FIG. 7 is a schematic illustration of a fifth embodiment of a monitoring and control system wherein flow rate control is present in the underflow stream and a split ratio control is present on the overflow stream.

FIG. 7 illustrates another control system in which the flow rate through first hydrocyclone separator 24 is controlled either with fixed orifice plate restriction 94 or a back pressure regulator 96. Monitoring devices 86 and 74 and control system 78 control the control valve 77 in first overflow stream 40 to control the split ratio. If the second separator 44 is used, the fixed orifice restriction 94 would preferably be located in second underflow stream 46; this would prevent shearing of oil droplets in first underflow stream 38 as it passed through fixed orifice restriction 94.

Of course, a control system for the separation systems shown in FIGS. 1, 2 or 8 could utilize multiple monitoring devices monitoring one or more of the various streams as illustrated in FIGS. 3–7. Also, more than one control valve could be utilized, including any of the examples shown in FIGS. 3–7 or combinations thereof. Depending upon the characteristics of the particular system involved, the most appropriate monitoring and control points can be chosen so as to control the split ratio between the first underflow stream 38 and first overflow stream 40 of the first hydrocyclone separator 24 and thus assure the most efficient operation thereof to provide suitably clean water discharged to the sea through discharge conduit 52 while still minimizing any unnecessary diversion of water to the ships storage 16.

In some circumstances where the variation of the oil concentration in the incoming recovered fluid stream is relatively constant, such a monitoring and control system may not be necessary. For example, if the oil concentration of the recovered fluid stream entering the first hydrocyclone separator 24 can be maintained at no greater than about ten percent oil and thus ninety percent water, then a first hydrocyclone separator 24 having a fixed split ratio can be utilized. In such a situation, the first hydrocyclone separator 24 would typically be set to have a split ratio such that ninety percent of the incoming flow went to the first underflow stream 38 and ten percent of the incoming flow went to the first overflow stream 40. This can be accomplished with either a fixed orifice plate 94 or a back pressure controller 96 like those shown in FIG. 7.

Preferred Geometry For First Hydroyclone Separator 24

It should be emphasized that the hydrocyclone separator concept as described in this disclosure is defined in terms of the process performed by the hydrocyclone separator, not by the particular geometry of the hydrocyclone. Nevertheless, preferred geometries are being disclosed.

Hydrocyclone separators of the prior art have typically been optimized for the purpose either of de-oiling in which a relatively small percentage of oil is removed from a water stream, or dewatering in which the incoming oil/water stream contains much larger concentrations of oil.

In the de-oiling hydrocyclones of the prior art exemplified by U.S. Pat. Nos. 4,576,724 and 4,764,287 each to Colman et al., the hydrocyclone is designed for a water-continuous phase with a dispersion of oil therein. With the dewatering hydrocyclones exemplified by U.S. Pat. No. 4,749,490 to Smyth et al., the incoming oil/water mixture typically contains from sixty to eighty percent oil and correspondingly from forty to twenty percent water; thus providing an oil continuous phase with water droplets dispersed therein.

The preferred first hydrocyclone separator 24 of the present invention is intended for use in situations where there typically will be a water continuous phase and wherein the oil and water mixture will contain at least sixty percent water by volume, which will insure that it is the water phase which is continuous. At water concentrations in the range of from thirty to sixty percent, it is difficult to predict whether the water or oil will form the continuous phase of the mixture, and a phase inversion situation can be encountered which is undesirable.

If the oil concentration exceeds sixty percent, then preferably the fluid will be bypassed directly to the ships storage 16 through bypass conduit 32 as seen in FIG. 1.

It has been determined that the preferred geometry for the first hydrocyclone separator 24 of the present invention, when operating on a continuous water phase, is that generally similar to the de-oiling hydrocyclone as shown in U.S. Pat. Nos. 4,576,724 and 4,764,287, the details of which are incorporated herein by reference, except that the diameter of the overflow outlet should be increased as compared to the preferred diameters disclosed in the cited patents for the de-oiling hydrocyclones. Where, for example, the preferred de-oiling hydrocyclone geometry of U.S. Pat. No. 4,576,724 to Colman et al. has a ratio of $d_o/d_2$ of less that 0.1, the preferred first hydrocyclone separator 24 geometry would have $d_o/d_2$ greater than 0.1 and typically less then 0.35. Preferably no vortex finder is used on the overflow outlet. If high oil content is encountered it may even be desirable to use $d_o/d_2$ up to 0.5 with possible inclusion of a vortex finder to prevent short circuiting.

As used in U.S. Pat. No. 4,576,724 and herein, $d_o$ refers to the diameter of the overflow outlet and $d_2$ is the diameter of the divergent end of the intermediate portion of the cyclone chamber.

Thus it is seen that the apparatus and methods of the present invention readily achieve the ends and advantages mentioned as well as those inherent therein. While certain preferred embodiments of the invention have been illustrated and described for purposes of the present disclosure, numerous changes in the arrangement and construction of the invention may be made by those skilled in the art which changes are encompassed within the scope and spirit of the present invention as defined by the appended claims.

What is claimed is:

1. An apparatus for recovering oil spilled in a body of water comprising:
   (a) means for recovering a fluid stream containing oil and water from a body of water;
   (b) monitor means for monitoring the makeup of the recovered fluid stream;
   (c) a first hydrocyclone means for receiving and separating the monitored fluid stream into a first more dense stream and a first less dense stream;
   (d) control means for controlling the split ratio between the first more dense stream and the first less dense stream in response to only the monitor means;
   (e) storage means for receiving at least a majority of the first less dense stream;
   (f) a second hydrocyclone means for receiving and separating the first more dense stream into a second more dense stream and a second less dense stream; and
   (g) means for returning at least a majority of the second more dense stream to the body of water.

2. An oil spill recovery process for recovering spilled oil from a body of water comprising the steps of:
   (a) recovering a fluid stream containing oil and water from the body of water;
   (b) monitoring the makeup of the recovered fluid stream;
   (c) separating the monitored fluid stream into a first more dense stream and a first less dense stream in a first hydrocyclone;
   (d) controlling the split ratio between the first more dense stream and the first less dense stream in response to only the monitoring of step (b);
   (e) storing at least a majority portion of the first less dense stream in a storage zone;
   (f) separating the first more dense stream into a second more dense stream and a second less dense stream in a second hydrocyclone; and
   (g) returning at least a majority portion of the second more dense stream to the body of water.

* * * * *